Sept. 2, 1958    J. E. PETRI    2,849,917
STEREO VIEWER
Filed May 29, 1953

INVENTOR
JAN E. PETRI
BY
Louis L. Gagnon
ATTORNEY

United States Patent Office 2,849,917
Patented Sept. 2, 1958

2,849,917

STEREO VIEWER

Jan E. Petri, Pomfret, Conn., assignor to American Optical Company, Southbridge, Mass., a voluntary association of Massachusetts Application May 29, 1953, Serial No. 358,431

2 Claims. (Cl. 88—29)

This invention relates to devices for use in viewing stereographs or stereograms and has particular reference to the provision of a relatively simple and inexpensive hand-supported stereo viewing device.

One of the principal objects of the invention is to provide a simple, efficient and inexpensive hand-supported stereo viewing device for directly viewing stereographs or stereograms in sheet form such, for example, as on pages of books, magazines, catalogs, or the like for obtaining a three-dimensional effect.

Another object is to provide a device of the above character embodying two optical elements, an integral supporting structure, and an integral handgrip portion all formed simultaneously of a transparent plastic or artificial resinous material by injection molding and with selected areas of said optical elements and the integrally related support having a frosted surface texture and the remainder of said optical elements having optically finished surfaces of controlled related shapes.

Another object is to provide a device of the above character having base-out prism elements of controlled plus power for viewing stereographs or stereograms three-dimensionally and having the nasal sides of said elements provided with frosted light diffusing areas which are so controlled dimensionally as to render the images of the stereographs or stereograms separately visible to each of the respective eyes of the observer.

Another object is to provide a device of the above character and method of making the same of a transparent plastic or artificial resinous material having base-out prism elements supported in given spaced relation with each other by an integrally related bridge and a handgrip portion extending outwardly to one side of one of said prism elements, each of said prism elements having a frosted light diffusing area on the nasal side thereof with each area having a relatively straight vertical bounding line separating it from the remaining area of the prism element to function as a septum to render the pictures viewable separately by each respective eye, said bridge and handgrip portion each having recessed areas with a relatively thin web lying therein.

Other objects and advantages of the invention will become apparent from the following description taken in connection with the accompanying drawings, and it will be apparent that many changes may be made in the details of construction, and arrangement of parts shown and described without departing from the spirit of the invention as expressed in the accompanying claims. The invention, therefore, is not to be limited to the specific details of construction, and arrangement of parts shown and described, as the preferred form only has been given by way of illustration.

Referring to the drawings.

Figure 1:
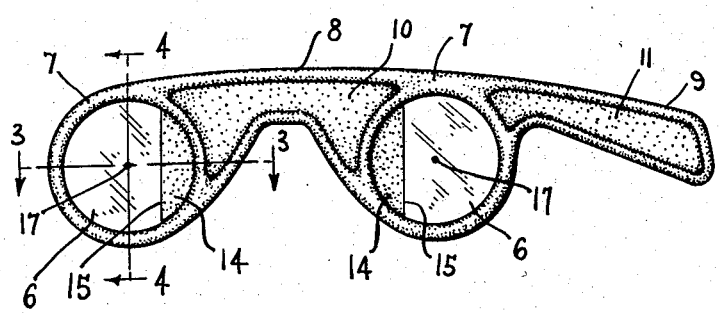
Fig. 1 is a front elevational view of the device embodying the invention.
Figure 2:
Fig. 2 is a top plan view of the device shown in Fig. 1.
Figure 3:
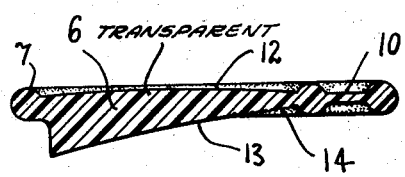
Fig. 3 is an enlarged sectional view taken as on line 3—3 of Fig. 1 and looking in the direction indicated by the arrows.
Figure 4:
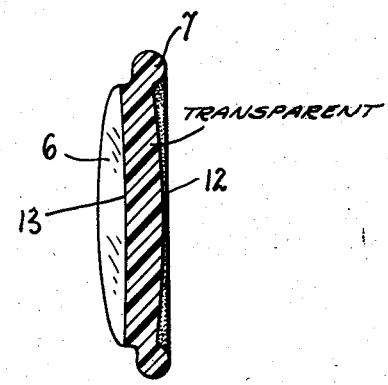
Fig. 4 is an enlarged sectional view taken as on line 4—4 of Fig. 1 and looking in the direction indicated by the arrows.

The device embodying the invention is intended for use as a book stereo viewer for viewing stereograms or stereographs in page form and adapted to be held in the hand of the observer. All that is necessary in using the viewer is to vary the distance of the viewer from the eyes and from the pictures being observed until the latter are fused and no fringe pictures are visible to the observer.

Referring more particularly to the drawings wherein like characters of reference designate like parts throughout the several views, the device embodying the invention comprises a pair of base-out prism lens elements 6, a pair of supporting rim members 7 surrounding said elements and a bridge member 8 joining said rim members. A handgrip portion 9 shaped to extend outwardly to one side of one of said rim members is provided as means for manually supporting the device before the eyes. The prism lens elements 6, rim members 7, bridge member 8 and handgrip portion 9 are all formed of a transparent plastic or artificial resinous material in integral relation with each other and to the size, shape and surface textures desired. The central area 10 of the bridge 8 and the central area 11 of the handgrip portion 9 are preferably formed relatively thin and are surrounded by outer beaded edges similar to the rims 7 to reduce the amount of material required in forming said device.

It is further pointed out that the prism lens elements are provided with an overall spherical power by forming the opposed surfaces 12 and 13 to controlled curvatures in accordance with the power desired. The surfaces 12 and 13, throughout the major portion thereof, are provided with an optical finish simulating that of an optically polished glass lens so that a clear undistorted image is visible therethrough. However, the inner nasal portions 14 of each prism lens element is provided with a light diffusing surface whereby an area divided from the main optical area by a vertical dividing line 15 and of a controlled size is formed on the nasal side of each respective lens. This renders said nasal areas effectively opaque to vision and enables them to function as a septum for rendering the pictures to be viewed separately visible to each respective eye and also enables the fringe pictures which might appear on either side of the stereo picture to be eliminated. The prisms are of a controlled prism power to overcome separation of pictures greater than normal interpupillary distance whereby their images may be brought into the fusional range of the eyes of the observer.

The prism supporting structure including the rim members 7, bridge 8, and handgrip portion 9 are preferably provided with a frosted or light diffusing surface and the exposed edge portions 16 of the prism elements are also provided with a frosted or light diffusing surface.

The resultant device, as set forth above, is preferably formed by an injection molding process using a transparent artificial resinous or plastic material with the surface textures of the various parts being controlled during said injection molding by controlling the surface texture of the different portions of the mold which form the respective parts of the device.

The distance between the centers 17 of the prism lens elements is controlled according to the average interpupillary distance of adults, which is 64 mm., and that of children ranging from 6 to 11 years old, which is 58 mm., and in the present instance is approximately 60 mm. The effective interpupillary distance, however, may be varied through the aid of the septum arrangement by moving the viewer slowly away from the eyes (after a three-dimensional picture has been brought into focus) until fringe pictures are blotted out.

The focal power of the prism lens elements depends upon the size of picture to be viewed and the prism power of said elements depends upon the size and the distance between the pictures that is, the amount of separation of the pictures.

With the present arrangement the lens elements 6 have a focal power of approximately +3.00 D. by forming the surface 13 with a —3.00 D. sphere and the surface 12 with a +6.00 D. sphere and are intended for a reading distance of approximately 12″. The prism power of the lens elements is approximately 12.00 D. base-out for pictures spaced apart a distance of approximately 11 cm. The device is designed as a book stereo viewer with the pages of the book being provided with stereographs or stereograms to be viewed by the said device by holding the device in the hand and moving it to a proper position of viewing.

Pictures of sizes ranging from 2″ square to 3′ square may be used, it being understood of course that the focal power and prism power of the lenses and viewing distance would be varied accordingly. The powers are controlled by providing the injection molding cavities with interchangeable prism lens forming elements having the characteristics required for forming said different focal and prism powers.

The use of the device is extremely simple. It is merely held in the hand horizontally or in a position to extend in a direction transversely of the stereograph or stereogram to be viewed and moved rearwardly or forwardly relative thereto until the images are brought into proper fusional and three-dimensional relation with each other. The viewing device is then further moved slowly rearwardly or forwardly until fringe pictures are eliminated.

From the foregoing description it will be seen that simple, efficient and economical means have been provided for accomplishing all of the objects and advantages of the invention.

I claim:

1. A unitary all-plastic device for viewing stereograms and the like embodying a pair of pictures to be viewed separately by the respective eyes of the user so as to be fused into a three-dimensional image, said device comprising a pair of base-out prism lens elements having integrally related circularly cross-sectioned beaded edges which form supporting rims surrounding said lens elements, an integral bridge member joining said rims, said bridge member having a continuous transversely extending beaded edge joining the upper portions of the rims in flush smoothly blended relation therewith and having a nasal recess in the lower side thereof with a beaded edge curving toward and joined with the nasal sides of the rims in flush smoothly blended relation therewith and a relatively long and slender integral hand-grip member extending outwardly of the temporal side of one of said supporting rims and having a beaded edge blending smoothly into said rims, said bridge and said hand-grip member, inwardly of their beaded edges, being relatively thin as compared with the thickness of their beaded edges, said prism lens elements having opposed optically finished surfaces of controlled related curvatures which are such as to introduce a given amount of magnification of the pictures viewed therethrough and having their optical centers located a controlled distance apart in accordance with the interpupillary distance of the intended user of said device, said lens elements each having an area on the nasal side thereof provided with a light diffusing surface having a relatively straight vertically disposed edge dividing said light diffusing surfaces from the remainder of the lenses and spaced inwardly of the respective optical centers of said lenses, said relatively straight vertically disposed edges being so spaced relative to each other in accordance with the interpupillary distance of the user that said areas will function as a septum for rendering the pictures separately visible to each respective eye when viewing the pictures through said device at approximately normal reading distance.

2. A unitary all-plastic device for viewing stereograms and the like embodying a pair of pictures to be viewed separately by the respective eyes of the user so as to be fused into a three-dimensional image, said device comprising a pair of circularly shaped base-out prism lens elements having integrally related circularly cross-sectioned beaded edges which form supporting rims surrounding said lens elements, an integral bridge member joining said rims, said bridge member having a continuous slightly upwardly curving transversely extending beaded edge joining the upper portions of the rims in flush smoothly blended relation therewith and having a nasal recess in the lower side thereof with a beaded edge curving toward and joined with the nasal sides of the rims in flush smoothly blended relation therewith and a relatively long and slender integral hand-grip member extending outwardly of the temporal side of one of said supporting rims and having a beaded edge blending smoothly into said rims, the upper beaded edge of said hand-grip member being flush with and of the same continuous shape as the upper beaded edge of the bridge member, said bridge and said hand-grip member, inwardly of their beaded edges, being relatively thin as compared with the thickness of their beaded edges, said prism lens elements having opposed optically finished surfaces of controlled related curvatures which are such as to introduce a given amount of magnification of the pictures viewed therethrough and having their optical centers located a controlled distance apart in accordance with the interpupillary distance of the intended user of said device, said lens elements each having an area on the nasal side thereof provided with a light diffusing surface having a relatively straight vertically disposed edge dividing said light diffusing surfaces from the remainder of the lenses and spaced inwardly of the respective optical centers of said lenses, said relatively straight vertically disposed edges of said light diffusing surfaces being so spaced relative to each other in accordance with the interpupillary distance of the user that said areas will function as a septum for rendering the pictures separately visible to each respective eye when viewing the pictures through said device at approximately normal reading distance.

References Cited in the file of this patent

UNITED STATES PATENTS

| | | |
|---|---|---|
| 188,769 | Beckers | Mar. 27, 1877 |
| 1,186,786 | Huber et al. | June 13, 1916 |
| 1,340,579 | Tousey | May 18, 1920 |
| 2,032,139 | Macy | Feb. 25, 1936 |
| 2,338,735 | Person | Jan. 11, 1944 |
| 2,516,373 | Ehlert et al. | July 25, 1950 |
| 2,558,026 | Wilson | June 26, 1951 |

FOREIGN PATENTS

| | | |
|---|---|---|
| 68,912 | Denmark | Mar. 28, 1949 |